Aug. 30, 1960          W. G. McLOUGHLIN          2,950,876
                     HIGH SPEED PAY OUT REEL
Filed March 27, 1959                          2 Sheets-Sheet 1
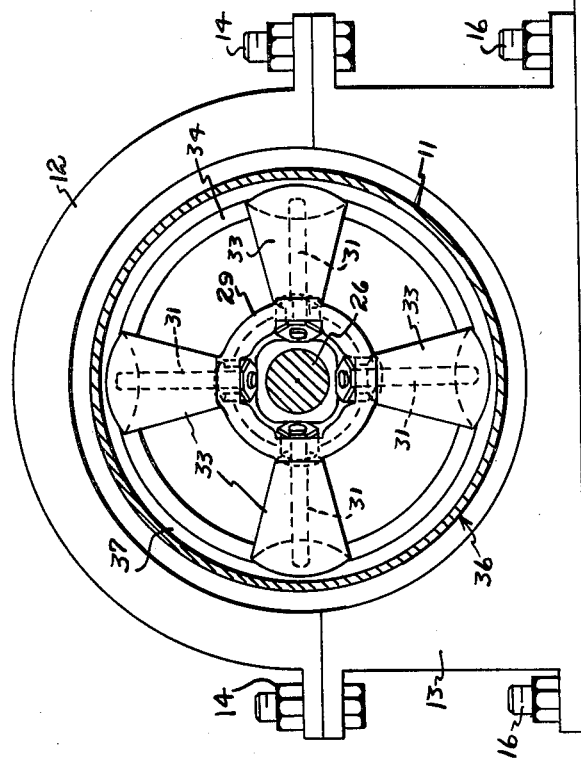
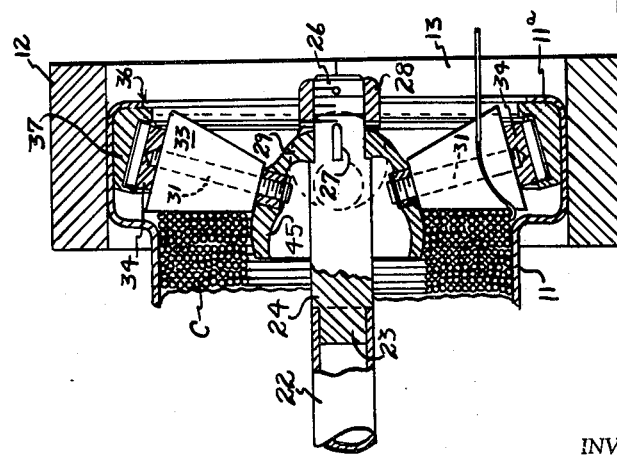
INVENTOR.
William G. McLoughlin
BY
Jennings, Carter & Thompson
Attorneys Aug. 30, 1960                  W. G. McLOUGHLIN                  2,950,876
                              HIGH SPEED PAY OUT REEL
Filed March 27, 1959                                          2 Sheets-Sheet 2
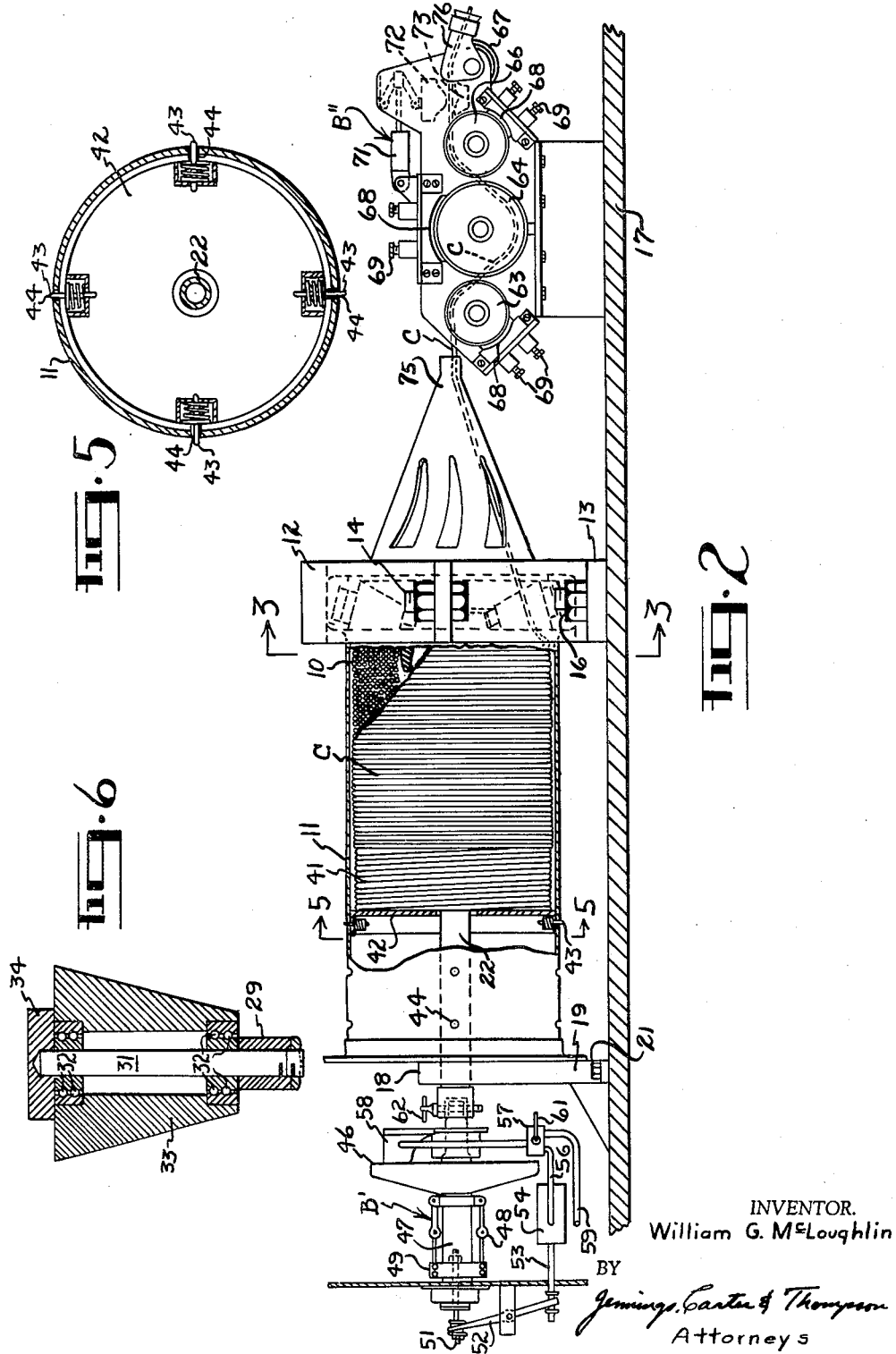
INVENTOR.
William G. McLoughlin
BY
Jennings, Carter & Thompson
Attorneys United States Patent Office 2,950,876
Patented Aug. 30, 1960

2,950,876

HIGH SPEED PAY OUT REEL

William G. McLoughlin, Birmingham, Ala., assignor to Hayes Aircraft Corporation, a corporation of Alabama Filed Mar. 27, 1959, Ser. No. 802,380

12 Claims. (Cl. 242—128)

This invention relates to apparatus for paying out cable at high speeds, and particularly to the paying out of cable from aircraft at speeds near to and above sonic speed.

A specific use to which my apparatus is particularly adaptable is in towing targets for gunnery and guided missile target practice at high speeds and in which the target is a great distance behind the towing aircraft. Distances of eight to fourteen thousand feet are quite common. Due to the forces involved the size of the towing cable may vary from piano wire size to as much as wire of ⅝ inch in diameter depending upon such factors as speed, drag of target, line length, etc.

It is highly desirable that the tow cable be safely and smoothly payed out in minimum time. With certain short range, high speed aircraft and due primarly to their short range, even as much as a minute required to pay out the tow cable can be an important part of the total flight time for accomplishment of the mission at hand. Therefore, in order to prolong the useful flight time as much as possible it is desirable not only to pay out the cable as quickly as possible but also to jettison it upon completion of the mission, saving the time required to rewind the cable.

Heretofore in the art to which my invention relates, it has been proposed to pay out tow cable by mounting a cable drum for rotation with its axis athwart the fore and aft axis of the aircraft. This results in a system in which, particularly at the start of the pay out, there is a very large rotating mass of material, involving considerable kinetic energy. The problems of originally balancing a drum of cable of this kind and of keeping it in balance in such system during the pay out are quite complicated. Bearing problems in such systems are acute. Very large and heavy braking systems must be associated with such rotating drums in order to stop the pay out at the proper time. These and other problems make such prior cable pay out systems difficult and dangerous to use.

In view of the foregoing, the prime object of my invention is to provide high speed cable pay out apparatus which eliminates or materially reduces the disadvantages set out above.

A more specific object is to provide apparatus of the character designated in which the cable package itself is non-rotatably mounted and in which the cable pays out by being "peeled off" the end of the package with the package embodying a plurality of flat coils arranged in side-by-side relation to be paid out successively.

Another and more specific object is to provide cable pay off means comprising a shaft mounted adjacent the longitudinal axis of the cable package, a generally radially extending spindle on the end of the shaft at the pay off end of the cable, and a frusto-conical roller mounted for rotation on the spindle and disposed with its surface in rolling contact with the end of the cable package, whereby the shaft may be coupled to a brake, thus affording control over the cable being payed out as the roller rotates bodily around the end of the cable.

Another object is to provide apparatus embodying the foregoing features in which the cable package is retained against the rotating pay off roller with the surface of the roller extending for the entire radius of the package, holding the end coil of the package in position as the cable is payed out.

While I have shown a specific use for my pay out reel in the paying out of cable for towing targets, it is understood that my apparatus may be used for other high speed uses. One such use is in the paying out of communication wire from aircraft in military operations.

Briefly, my invention comprises a cylindrical receiver for a coil of cable. The cable package preferably embodies a plurality of flat cable coils arranged in side-by-side relation and formed in the shape of a cylinder whereby the package is slipped into the cylindrical receiver, there being an axially extending opening in the cable package. Passing through the central opening in the package and journaled at the rear end of the package in a suitable bearing is a shaft. Immediately adjacent the forward end of the receiver and mounted non-rotatably on the shaft are spindles, preferably four in number, extending generally radially of the shaft and cable package. Rotatably mounted on the spindles are frusto-conical rollers. The spindles are so directed from the shaft that the surfaces of the rollers adjacent the end of the cable package lie parallel to the end surface of the package. A spring located at the rear end of the receiver urges the entire cable package forwardly against the rollers. The forward end of the shaft carries a speed control means in the form of a centrifugally actuated brake, thereby to limit the pay out speed of the cable. Also, this brake may be applied by manual controls, thus to stop the pay out of the cable when desired. A second brake which frictionally engages the cable itself may be located at the rear of the pay out roller, serving further to limit the speed of pay out. In order that the cable may pay out evenly and also to permit the end of the cable package to bear against the rollers, the cable is wound into the package by a type of winding wherein the individual flat coils are arranged in side-by-side relation and pay out successively from between the outer and inner circumferences of the rear end of the package.

Apparatus illustrating features of my invention is shown in the accompanying drawings, forming a part of this application, in which:

Fig. 1 is a wholly diagrammatic view of an aircraft towing a target;

Fig. 2 is a side elevational view of my improved apparatus together with the forward and rear brakes, the view being partly broken away and in section;

Fig. 3 is an enlarged detail sectional view taken generally along line 3—3 of Fig. 2;

Fig. 4 is a detail sectional view taken generally along line 4—4 of Fig. 3;

Fig. 5 is a detail sectional view taken generally along line 5—5 of Fig. 2; and, Fig. 6 is a sectional view showing the bearing arrangement for one of the pay out rollers.

In Fig. 1, I show an aircraft A which may be towing a target T through the cable C. The cable C may be anywhere from eight to forty thousand feet long and may be from piano wire sizes to wire of ⅝ inch in diameter.

As best shown in Fig. 2 the cable C is wound in the form of a cylindrical package having an opening 10 therethrough. Further, the package is wound into a plurality of generally parallel flat coils or layers arranged in side-by-side relation with each flat coil comprising a plurality of cable turns, and pays out between the inner and outer circumferences thereof.

My improved apparatus comprises a cylindrical holder or receiver 11 for the package of cable C. The receiver may be supported at the rear end of the package as shown in Fig. 4 by inserting the end 11ᵃ of the same in the end of a split annular support member having upper and lower halves 12 and 13. The semi-circular halves of the support member are held together by nuts and bolts indicated at 14. The lower half may be secured by bolts 16 to a suitable supporting part of the aircraft which is indicated generally as a floor member 17.

At the rear of the receiver is a bearing 18 which is mounted on a standard 19, the latter being bolted to the floor by studs 21. Mounted in the bearing 18 is a tube 22 which extends rearwardly toward the support members 12 and 13. The tube carries at its rear end a length of shaft 23 which is welded thereto as indicated at 24. The shaft 23 is threaded as indicated at 26 and also may be provided with a keyway 27.

Fitting non-rotatably on the shaft 23 and secured thereto by a key in the keyway 27 and a nut 28 is a spider 29. The spider 29 is adapted to support four outwardly extending spindles 31. Mounted on suitable bearings 32 secured about each spindle 31 are anti-friction means comprising frusto-conical rollers 33. It will be noted that the angle of the spindles is such that the surfaces of the rollers adjacent the end of the cable package C are radial to the end of the package.

The outer ends of the spindles fit into suitable openings in the inner race 34 of a heavy duty roller bearing indicated generally by the numeral 36. The outer race 37 of the bearing 36 fits into the annular end 11ᵃ of the receiver 11 and is held assembled by the support members 12 and 13 as shown. Thus, the spider 29 and the rollers 33 are supported for the rollers both to rotate about the spindle 31 in rolling contact with the surface of the end coil for substantially the entire radius thereof and for the rollers to rotate bodily, in planetary fashion, about the end of the cable package C.

At the forward end of the package in the receiver is a compression spring 41. The spring 41 is backed up by a plate 42 which is held against left-hand or forward movement as viewed in Fig. 2 by means of a plurality of pins 43 which enter openings 44 in the receiver 11. The pins 43 are spring biased outwardly so that they may be pushed in and the plate 42 removed. The receiver is provided with a plurality of spaced rows of holes 44 as shown in Fig. 2 thus to accommodate longer or shorter coils of cable C. With the cable package in the receiver as shown and with the spring 41 in place and the pins 43 in the holes as illustrated, the entire cable package C is pushed to the right as viewed in Fig. 2, and held against the rollers 33. A cable retention sleeve 45 is integrally formed on spider 29 to retain the cable in rolling contact on the surface of roller 33 and thereby keep the cable from slipping off the end of roller 33.

At the forward end of the receiver is a brake indicated generally by the letter B'. The brake B' may be of the centrifugal type in which a drum 46 is mounted on a shaft 47. Fly balls 48 are operatively connected through a collar 49 to a shaft 51. The shaft 51 operates a lever 52 which is connected as shown to piston rod 53 of a master cylinder 54. The master cylinder 54 supplies fluid under pressure, when the piston rod is actuated, through a line 56 to a valve 57 and to a brake cylinder 58, thus to slow the rotation of drum 46. A line 59 from a source of fluid under pressure, not shown, leads also to the valve 57. By means of a control handle 61 the master cylinder 54 may be cut out of operation and fluid under pressure supplied to the cylinder 58 directly from line 59.

The shaft 47 is connected by a quick connector pin 62 to the forward end of the tube 22.

Rearwardly of the receiver and pay out rollers, I provide a line brake indicated generally by the letter B''. In view of the fact that brakes of this general type are known in the art a detail description is not believed necessary. Suffice it to say that the cable C passes over a pulley 63, under a pulley 64 and over another pulley 66. The cable finally passes out over a guide roller 67. Each of the pulleys 63, 64 and 66 have associated therewith a brake shoe 68. Suitable mechanism in the form of bolt adjusted springs 69 are provided to urge the brake shoes against the pulleys. Furthermore, a hydraulic cylinder 71 may be provided which is adapted to force a shoe 72 downwardly onto cable C, engaging it against a stationary shoe 73, thus to slow down the cable.

From the foregoing, the method of constructing and using my improved apparatus may now be more fully explained and understood. First, it will be understood that the holder is mounted parallel to the fore and aft axis of the aircraft and suitably secured therein. When it is desired to load the receiver, pin 62 may be withdrawn and the receiver lifted up by removing the bolts 21 and 14. The cable may be coated with plastic resins, such as acrylic resins, or the like applied thereto to cause the coils to adhere thus to prevent displacement during handling. With the cable package inserted in place in holder 11 the spring 41 and plate 42 are assembled, thus to push the entire package rearwardly with its rear end lying against the surface of the rollers 33. The holder is now reinstalled in the aircraft and the pin 62 put in place thus connecting the tube 22 to the drum 46 of the forward brake B'. The cable is threaded over one of the rollers 33 and out the hawse tube 75, through the brake B'' and a second hawse tube 76, and thence out of the aircraft to the target. With the aircraft in flight the target is let out to towing position by releasing the hydraulically controlled brake 72—73. The cable pays out in accordance with the setting of the brakes B' and B''. When it is desired to stop the pay out, the brake 72—73 is applied and valve 61 is opened, thereby gradually applying both the forward and rear brakes. It will be appreciated that the tube 22 is a torque tube, and since the tube is being driven by the rollers 33, the brake B' is driven through a resilient connection. This aids in preventing backlash on the cable when both brakes are applied.

It will be understood that the cable pays out from the end of the coil, remaining always in contact with the one of the rollers 33 over which it has been threaded. Since the surfaces of the rollers adjacent the end of the package are radial, the flights of the winding of the coil pay out evenly and smoothly and rotate the rollers bodily about the end of the package with the individual rollers themselves rotating on their spindles 31. The spring 41 continues to bias the package rearwardly, maintaining good and firm contact with the rollers. If desired, the rollers may be mounted for sliding movement along the shaft with the cable package remaining stationary within receiver 11.

It will be understood that my invention is particularly characterized by the provision of a stationary cable package and a rotating pay out member together with a brake driven by the rotating pay out member. My invention thus eliminates the large amount of kinetic energy present in cable packages which themselves rotate and I have thereby eliminated the many disadvantages of such systems. It will further be appreciated that the speed at which the cable can be payed out with my invention is extremely great due to the relatively small mass of the rotating members used to effect the pay out. My invention therefore increases the useful mission time of high speed aircraft used for tow purposes. It will be further understood that when the mission is completed the brakes B' and B'' may simply be released, letting go of the remaining cable, thus to jettison it from the aircraft. Likewise, it will be apparent that remote control cable cutters of known types can be installed to cut the cable if that is desired.

While I have shown my invention in but one form, it will be obvious to persons skilled in the art that it is not so limited but is susceptible of various changes and modifications without departing from the spirit thereof and I desire, therefore, that only such limitations be placed thereupon as are specifically set forth in the appended claims.

What I claim is:

1. In apparatus for paying out cable, a holder disposed to support a cable package wound in a plurality of flat coils in side-by-side relation with each coil comprising a plurality of cable turns for paying out the cable from one end thereof, a roller contacting the end coil of the package and over which the cable passes from the package in paying out, means supporting the roller for rotation about an axis generally parallel to the direction of payout of the cable, means to maintain the roller in contact with the end coil of the package as the cable pays out, and means to brake the rotation of the roller about said axis.

2. In cable pay out apparatus, a receiver for a cable package wound in a plurality of flat coils in side-by-side relation with each coil comprising a plurality of cable turns for paying out from an end of the package, a roller located at the pay out end of the package and over which the cable passes, means supporting the roller with the surface thereof adjacent the package parallel to the end surface of the package and in rolling contact with the end coil, means mounting the roller for bodily rotary movement about an axis generally parallel to the direction of pay out of the cable, means to maintain the roller in contact with one end of the cable package as the cable pays out, and brake means operatively connected to the roller for controlling the rate of pay out of the cable.

3. In cable pay out apparatus, a cylindrical receiver for receiving a wound hollow cable package embodying a plurality of generally parallel flat coils in side-by-side relation with each coil comprising a plurality of cable turns, a shaft passing through the cable package and mounted for rotation in suitable bearings, a rotary pay out roller on the shaft disposed to bear against the rear pay out end coil of the package and mounted for planetary-like movement about the end of the package with the shaft as the center of rotation, means to maintain the end of the cable package in contact with the roller as the cable pays out, and speed control means connected to the shaft.

4. In cable pay out apparatus, a holder, a cable package in the holder adapted to pay out from the rear end of the holder, said package embodying a plurality of generally parallel flat coils arranged in side-by-side relation with each coil comprising a plurality of cable turns whereby the coils are payed out successively from between the outer and inner circumferences of the rear end of the package, anti-friction means adjacent the pay out end of the package and contacting the cable as it is payed out, means supporting the anti-friction means with the surface thereof in contact with the end coil of the package along substantially the entire radius of the package, means mounting said anti-friction means for bodily concentric movement about the end coil of the package, said anti-friction means being driven by the unwinding of the coils as the cable pays out, means to maintain the anti-friction means in contact with the pay out end of the package as the cable is payed out, and means operatively connected to the anti-friction means and controlling the rate of pay out of the cable.

5. In cable pay out apparatus, a holder, a cable package in the holder adapted to pay out from the rear end of the holder, said package embodying a plurality of flat coils arranged in side-by-side relation whereby the coils are payed out successively from between the outer and inner circumferences of the rear end of the package, a frusto-conical roller adjacent the pay out end of the cable over which the cable passes as it is payed out, means supporting the roller with the surface thereof contacting the rear end coil along substantially the entire radius of the end coil, the small diameter end of the roller being disposed adjacent the inner circumference of the end coil and the large diameter end thereof disposed adjacent the outer circumference of the end coil whereby the end of the cable being payed out is directed toward the shaft by the inclined shape of the roller, means mounting said roller for bodily concentric movement about the end coil of the package, means to maintain the roller in contact with the pay out end of the coil as the cable is payed out, and means operatively connected to the roller and controlling the rate of pay out of the cable.

6. In cable pay out apparatus, a holder, a cable package in the holder adapted to pay out from the rear end of the holder, said package embodying a plurality of generally parallel flat coils arranged in side-by-side relation with each coil comprising a plurality of cable turns whereby the coils are payed out successively from between the outer and inner circumferences of the rear end of the package, a shaft passing through the package and the holder and mounted for rotation relatively thereto, anti-friction means mounted on the shaft adjacent the pay out end of the cable and contacting the cable as it is payed out, means mounting the anti-friction means on the shaft for rotation bodily with the shaft in concentric relation about the entire end surface of the end coil, said shaft being driven through said anti-friction means by the unwinding of the coils as the cable pays out, means to maintain the anti-friction means in contact with the end surface of the end coil as the cable is payed out, and means operatively connected to the anti-friction means and controlling the rate of pay out of the cable.

7. In cable pay out apparatus, a holder, a cable package in the holder adapted to pay out from the rear end of the holder, said package embodying a plurality of flat coils arranged in side-by-side relation whereby the coils are payed out successively from between the outer and inner circumferences of the rear end of the package, a shaft passing through the package and the holder and mounted for rotation relatively thereto, a frusto-conical rotary pay out roller mounted on the shaft adjacent the pay out end of the cable over which the cable passes as it is payed out, means mounting the roller on the shaft for rotation bodily with the shaft about the entire end surface of the end coil and in rolling contact with the end coil as the cable is payed out, the surface of the roller adjacent the end coil being parallel to the end surface of the rear end coil with the small diameter end of the roller being disposed adjacent the inner circumference of the end coil and the large diameter end disposed adjacent the outer circumference of the end coil whereby the cable being payed out is directed toward the shaft by the inclined surface of the roller, means to maintain the roller in rolling contact with the end surface of the end coil as the cable is payed out, and means operatively connected to the roller and controlling the rate of pay out of the cable.

8. In cable pay out apparatus, a shaft mounted for rotation in suitable bearings, a plurality of generally parallel flat cable coils arranged in side-by-side relation and forming a cable package with each coil comprising a plurality of cable turns and disposed around said shaft in spaced relation therefrom for paying out successively from an end of the shaft, means to support said package about said shaft whereby said shaft rotates relative to the package, a rotary pay out roller mounted on the shaft adjacent the pay out end of the cable over which the cable passes as it is payed out, means mounting the roller on the shaft for rotation bodily with the shaft and for rolling contact with the end coil of the package as the cable is payed out, the surface of the roller adjacent the end coil being parallel to said end coil whereby the cable rotates the shaft about its axis as the cable is payed out by moving the roller thereon about the end of the package, means to maintain the roller in contact with the end of the package as the cable is payed out, and means operatively connected to the roller and controlling the rate of pay out of the cable.

9. In apparatus for paying out cable, a cylindrical receiver, a cable package embodying a plurality of flat cable coils supported within said receiver and arranged in side-by-side relation so that the coils pay out successively from the rear end of the receiver, a shaft passing through the package and the receiver and mounted for rotation relative to the receiver, a pair of oppositely arranged rotary pay out rollers mounted on the shaft adjacent the pay out end of the cable with the cable passing over one of the rollers as it is payed out, means mounting the rollers on the shaft for rotation bodily with the shaft about the end surface of the package and for rolling contact with the end coil as the cable is payed out, the surface of the rollers adjacent the end coil disposed parallel to and contacting the end surface of the end coil, means to maintain the cable package in contact with the rollers as the cable pays out, brake means positioned rearwardly of the rear end of the receiver and operatively connected to the payed out end of the cable to control the rate of paying out of the cable, and brake means operatively connected to the shaft to control the speed of rotation of said shaft and thereby the rate of paying out of the cable.

10. Apparatus defined in claim 9 further characterized in that said means to maintain the cable package in contact with the rollers comprises an end plate removably positioned over the shaft adjacent the forward end of the cable package, and a coiled spring positioned between the end plate and the package to urge the package rearwardly as the cable is payed out.

11. Apparatus defined in claim 9 further characterized in that said rollers are frusto-conically shaped with the small diameter ends of the rollers being disposed adjacent the inner circumference of the end coil and the large diameter ends disposed adjacent the outer circumference of the end coil whereby the cable being payed out is directed toward the shaft by the inclined surfaces of the rollers.

12. Apparatus defined in claim 9 further characterized in that said brake means operatively connected to the shaft comprises a fluid operated centrifugal type brake disposed forwardly of and releasably connected to said shaft, and control means to actuate said brake.

References Cited in the file of this patent
UNITED STATES PATENTS

| | | |
|---|---|---|
| 1,329,240 | Hays | Jan. 27, 1920 |
| 2,842,323 | Rayburn | July 8, 1958 |
| 2,898,605 | Pearson | Aug. 11, 1959 |